United States Patent [19]

Sloan et al.

[11] Patent Number: 4,601,385
[45] Date of Patent: Jul. 22, 1986

[54] SELF-CLEANING TAIL PIECE

[76] Inventors: Charles S. Sloan, Rte. 1, Box 77 E; Norman G. Sloan, Rte. 1, Box 77D, both of Foster, W. Va. 25081

[21] Appl. No.: 589,231

[22] Filed: Mar. 14, 1984

[51] Int. Cl.$^4$ ............................................. B65G 45/00
[52] U.S. Cl. ................................. 198/495; 198/580
[58] Field of Search ................... 198/495, 580; 406/77, 406/79, 80

[56] References Cited

U.S. PATENT DOCUMENTS

| | | | |
|---|---|---|---|
| 1,863,562 | 6/1932 | Cannon | 198/580 X |
| 2,855,094 | 10/1958 | Zebarth | 198/495 |
| 3,809,211 | 5/1974 | Padilla | 198/580 X |
| 4,213,743 | 7/1980 | Hurt et al. | 198/502 X |

FOREIGN PATENT DOCUMENTS

| | | | |
|---|---|---|---|
| 39584 | 6/1965 | German Democratic Rep. | 198/495 |
| 38056 | 4/1978 | Japan | 198/495 |
| 51183 | 4/1979 | Japan | 198/495 |
| 54046 | 3/1943 | Netherlands | 198/580 |
| 428056 | 4/1935 | United Kingdom | 198/580 |
| 794729 | 5/1958 | United Kingdom | 198/495 |

Primary Examiner—Joseph E. Valenza
Assistant Examiner—Michael Stone
Attorney, Agent, or Firm—Cushman, Darby & Cushman

[57] ABSTRACT

The material-receiving end, or tail piece assembly of an endless belt conveyor in a mining installation is constructed so as to be self-cleaning in the sense that the normal spillage of the mined material such as coal on to the mine floor adjacent the tail piece is reduced or avoided, thereby eliminating the need to remove spilled material and eliminating the safety hazard inherent in such removal. This object is accomplished by automatically collecting, within the tail piece assembly, the material which normally spills off the upper belt run and conveying the collected material back to the upper run. In the preferred construction the tail piece assembly includes an enclosure surrounding the tail roller of the conveyor, water sprays for forming a slurry of the spilled material and a slurry pump for pumping the slurry to the upper belt run. Preferably the material spilling from the upper run is guided into contact with the tail roller to be reduced in size so that the particle will be readily pumpable in slurry form.

5 Claims, 4 Drawing Figures

SELF-CLEANING TAIL PIECE

This invention relates to tail piece assemblies loading stations in endless conveyor systems used in mining operations for transporting coal or other mined material. In particular it relates to tail piece assemblies which eliminate or reduce spillage of the mined material and of respirable dust and which provide protection for operators working adjacent such equipment.

BACKGROUND OF THE INVENTION

In conventional underground mining installations the mined material, such as coal, is transported by one or more endless belt conveyors. Typically, the material is deposited onto the upper conveyor run at one end of the conveyor and is thus transported away from the mining area to processing equipment or perhaps to another endless conveyor. The loading or receiving end of such a conveyor includes an assembly known as a tail piece, which carries a tail roller over which the endless conveyor belt passes as the lower run becomes the upper run of the belt. Conventionally the tail piece includes a rigid frame assembly anchored to the floor of the mine and having a coal-receiving opening directly above the upper run which is moving away from the tail roller. Typically the tail piece includes a framework having rigid frame members extending longitudinally of the belt, with the opposite ends of the tail roller being mounted in bearings fixed to the frame members. The upper and lower runs of the conveyor belt are located between these frame members. A thick, flexible flap of rubber or similar material is attached along each side edge of the coal-receiving opening, the inner edge of each flap overlying an edge portion of the upper run of the belt. The flaps thus define an elongated coal-inlet slot, and they serve as guides to direct the incoming coal onto the upper run.

During operation of a conventional tail piece system there is inherently some coal which bypasses the upper belt run by falling over the edges of the upper belt run either on to the mine floor or on to the upper surface of the lower belt run. Coal which is deposited on the lower run is carried to the tail roller where it beomes pulverized to an extent by the action between the belt and the tail roller, and this coal becomes deposited on the mine floor adjacent the tail piece. In addition, considerable coal dust is released from the tail piece.

Typically, the coal deposited on the mine floor is removed by manual shovelling of the coal. This results in an additional labor expense. More importantly, however, manual removal of the coal is a dangerous operation because the person or persons removing the coal must work in close proximity to the tail roller. Many serious accidents involving loss of fingers, hands and arms have resulted from accidental contact with the tail roller or the belt as it passes over the tail roller.

SUMMARY OF THE INVENTION

The present invention provides a tail piece installation which is self-cleaning in the sense that little or no coal or other mined material is released to the environment adjacent the tail piece, with the result that manual removal of spilled material is unnecessary or at least minimal, thereby eliminating a serious safety hazard. The essential feature of the installation is that the material which bypasses the upper belt run is automatically collected within the tail piece assembly and is discharged back to the upper run rather than being deposited on the mine floor, and this is accomplished without the necessity of providing an additional power source at the location of the tail piece.

According to one aspect of the invention the self-cleaning feature is accomplished by forming a slurry of that coal which bypasses the upper belt run and then pumping the slurry back to the upper run. This is accomplished, broadly, by enclosing the tail piece framing in a housing, providing water sprays in the housing to convert the bypassed coal to slurry form and pumping the slurry from the housing to the upper belt run at a location either in or close to the housing. The water sprays also reduce the release of coal dust from the housing by more than 50% by forming a slurry with the coal particles which are small enough to become airborne. In a preferred construction, the slurry is collected in the bottom of the housing and transported to the pump inlet by an auger-type conveyor arranged transversely of the direction of movement of the belt.

According to a preferred aspect of the invention, the coal which bypasses the upper run is intentionally guided onto the upper surface of the lower run so as to be conveyed to the tail roller. The reason for this is that some of the bypassed coal may be in the form of relatively large pieces which are not readily pumpable in slurry form. These large pieces will be reduced in size by the action of the belt and tail roller. The resulting smaller pieces will be further reduced in size by the auger, with the result that the coal which is discharged from the auger is pumpable as a slurry.

The auger and slurry pump are preferably driven from the conveyor, as by suitable mechanical drive connections to the tail roller. Sprocket and chain drives between the axle of the tail roller and the auger and between the axle of the tail roller and the rotor of the slurry pump are appropriate.

The supply of water to the spray nozzles is preferably responsive to movement of the conveyor belt so that the system operates only when the conveyor system is operating. In a typical installation, according to the invention, there is a belt-operated valve which remains open during movement of the belt to supply water from a pressurized water conduit which is typically present in the mine. The system thus requires no auxiliary power source, because the auger and slurry pump are driven from the conveyor and because the water sprays operate with the available water pressure.

Figure 1:
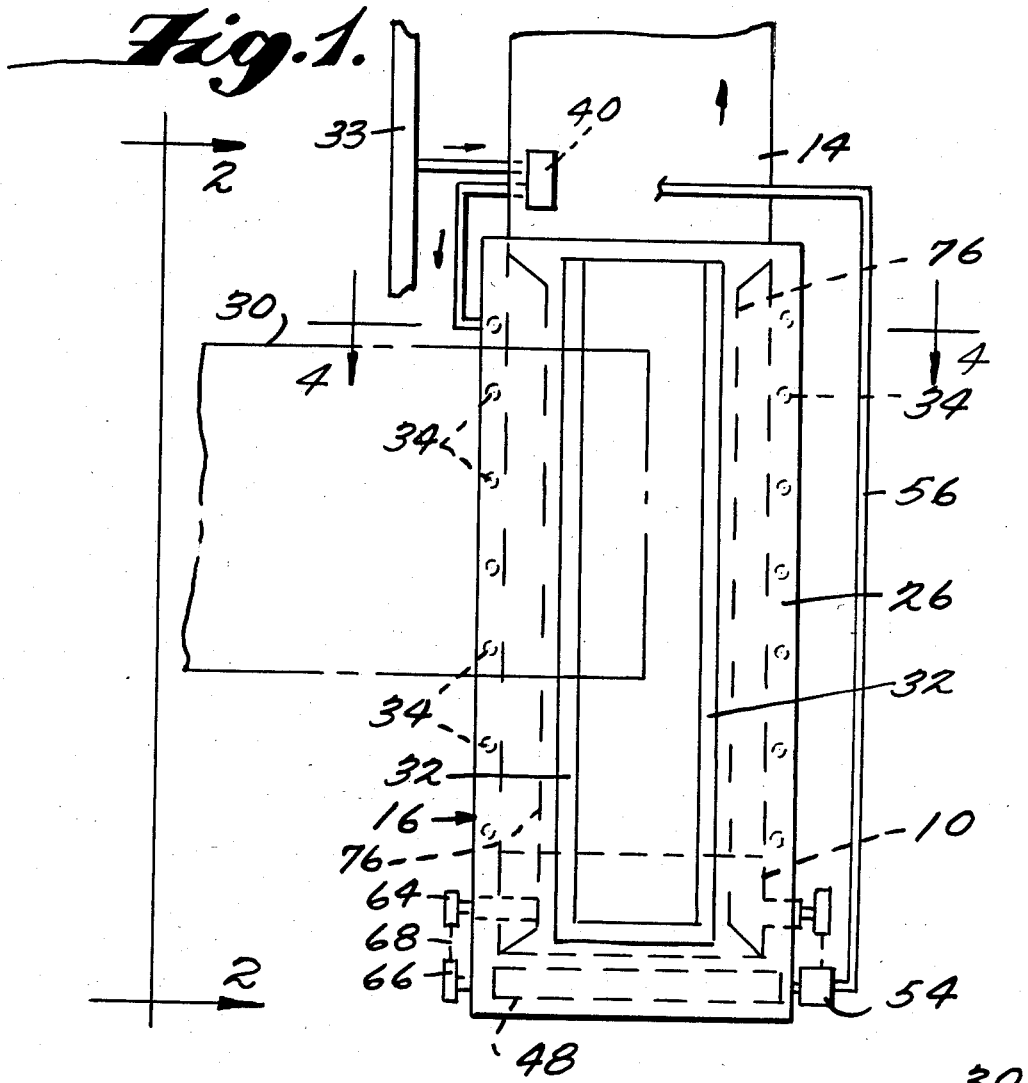
FIG. 1 is a schematic plan view of a tail-piece assembly embodying the principles of the present invention.

The major structural components of the tail roller assembly are the tail roller 10 itself, an endless belt having a lower run 12 and an upper run 14 looped over the tail roller 10 and an enclosure 16 surrounding the tail roller 10. The enclosure 16 rests on and is fixed to a mine floor 18 and includes various frame members which are not specifically identified. The axle of the tail roller 10 is mounted in bearings 20 which are supported by the side walls 22 of the enclosure 16. The end wall 23 of the enclosure 16 adjacent the tail roller 10 is closed and the end remote from the tail roller 10 is open at least to the extent of having openings for the belt runs 12 and 14. The enclosure bottom is closed by a bottom wall 24 and the enclosure top wall 26 has an elongated rectangular opening 28 therein through which particulate material such as coal is deposited onto the upper belt run 14. Typically, in a coal mine the coal will be discharged from a feeder-crusher 30. Each longitudinal edge of the opening 28 is provided with a tough flexible skirt 32 which guides incoming coal to the upper belt run 14. All of the views are schematic and non-essential details have been omitted. It will be appreciated that the upper belt run 14 will normally have its edges inclined upwardly by rollers located beneath the run 14.

During operation of the tail roller and belt while coal is being introduced through the opening 28, some coal will inherently fall from the side edges of the upper belt run 14 and thus bypass the upper run 14. According to the principles of this invention this bypass coal is slurried with water and the slurry is transferred to the upper belt run 14 to be carried out of the enclosure 16. To this end water sprays or jets are provided within the enclosure at suitable locations. In the illustrated embodiment a plurality of downwardly directed jets 34 are located below the lower belt run 12 and a plurality of horizontally directed jets 36 are located along the enclosure side walls 22. Water supply to the jets 34 and 36 is provided from a pressurized main water conduit 38 which is typically present in a coal mine, by way of a valve 40 which is opened and closed, respectively, by running movement or lack of running movement of the belt. Such valves are commercially available and include a rotatable actuating member 42 which is placed in frictional contact with the belt, in this case in contact with the lower surface of the upper belt run 14.

Figure 4:
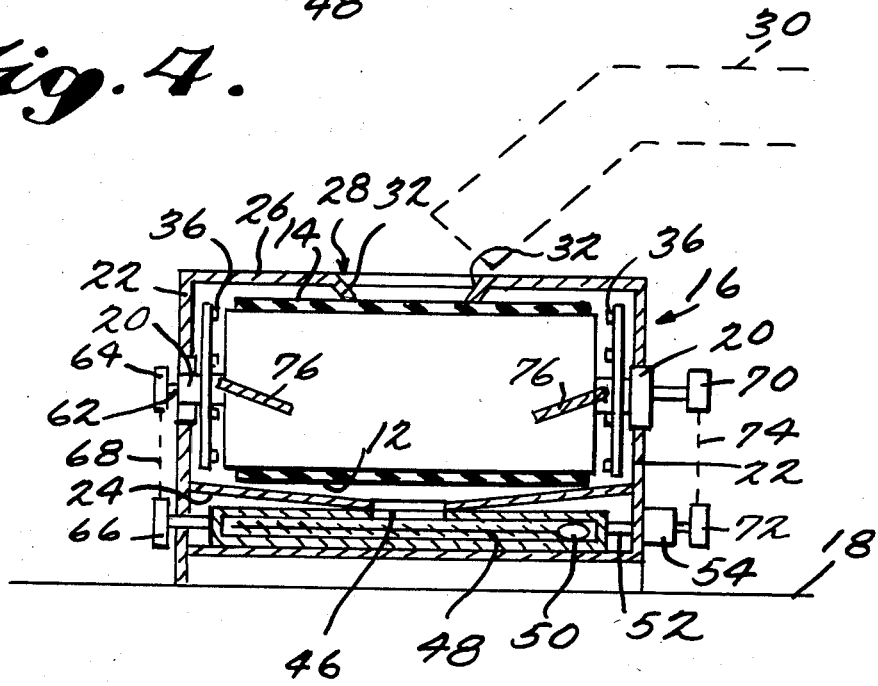
FIG. 4 is a schematic sectional view taken generally on the line 4—4 in FIG. 1.
Figure 2:
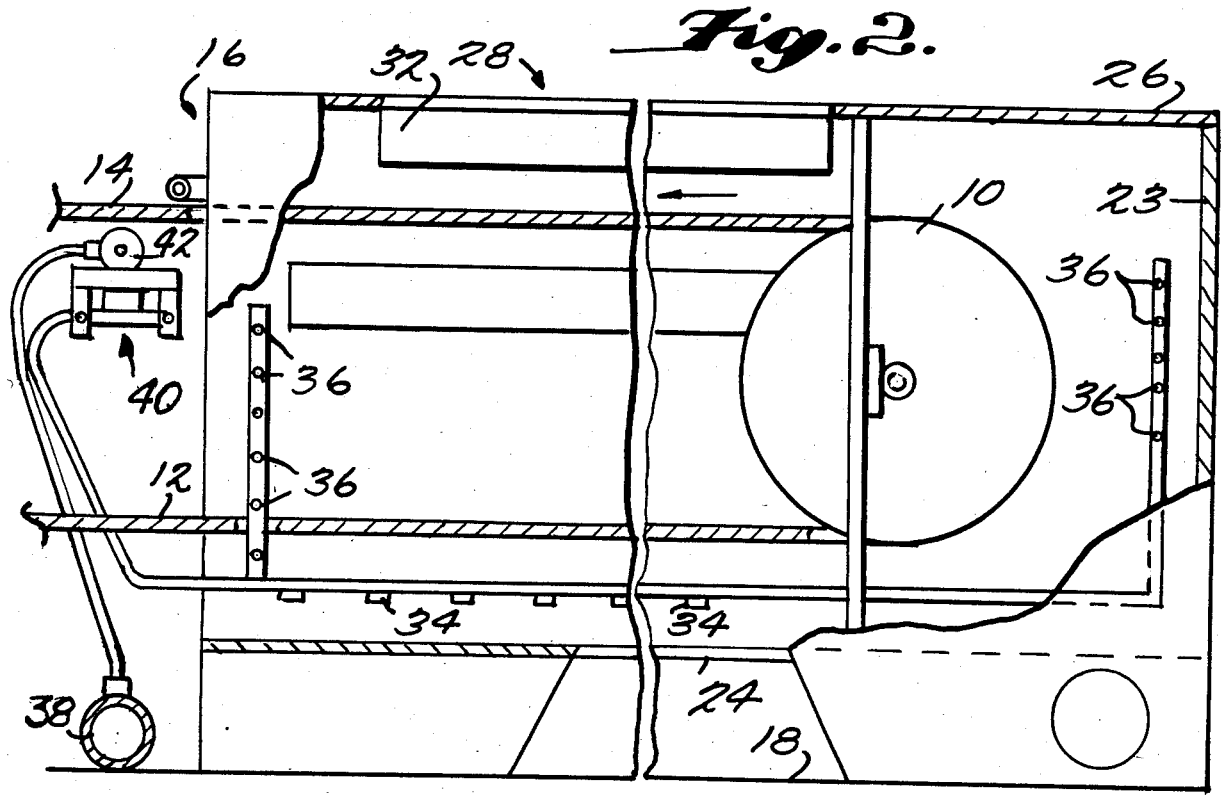
FIG. 2 is a schematic side view, partly broken away, of the assembly of FIG. 1, looking in the direction of arrows 2—2 of FIG. 1.
Figure 3:
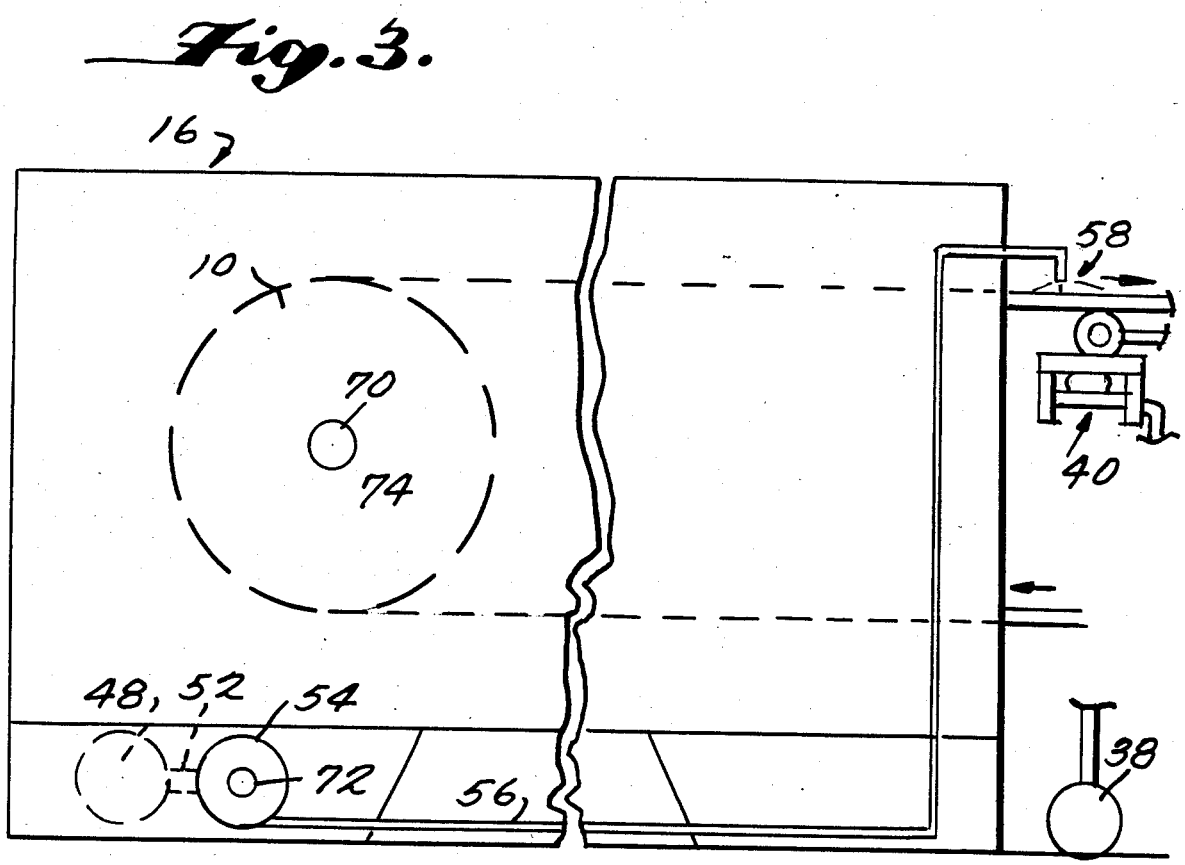
FIG. 3 is a schematic side view of the other side of the assembly.

The jets 34 and 36 wash the bypassed coal particles toward the bottom wall 24 of the enclosure, which as seen in FIG. 4 is slightly V-shaped in cross-section. The resulting coal/water slurry flows along the bottom wall 24 to an opening 44 which communicates with an opening 46 in the casing of an auger-type conveyor 48 which is disposed below the bottom wall 24. The jets 34 and 36 also convert to slurry form airborne coal dust and coal particles small enough to become airborne. The auger-type conveyor 48 has a discharge opening 50 connected by a pipe 52 to the inlet of a slurry pump 54. The outlet of the slurry pump 54 is connected to a slurry discharge line 56 which extends forwardly and upwardly to a location 58 above the upper belt run 14. The slurry is thus discharged downwardly onto the belt run 14 and is conveyed away by that run along with the major load of coal which was received from the feeder-crusher 30.

The screw 60 of the auger-type conveyor 48 is driven from the conveyor, as by means of a chain and sprocket drive from the tail roller. As illustrated, one end of the axle 62 of the tail roller 10 is fitted with a sprocket 64 and the outer end of the shaft of the screw 60 is fitted with a sprocket 66. A chain 68 is looped over the sprockets 64 and 66 whereby the screw 60 is rotated when the conveyor system is operating. It will be understood that the belt is driven by a remote drive (not shown) and that movement of the belt causes the tail roller 10 to rotate. The size of the sprockets 64 and 66 is chosen so that the screw 60 rotates more slowly than the tail roller 10.

The slurry pump is similarly driven by sprockets 70 and 72 and a chain 74, these elements being located at the other end of the axle 62 of the tail roller 10. The size of the sprockets 70 and 72 is chosen so the rotor of the slurry pump 54 (a centrifugal pump) rotates at about three times the rotational speed of the tail roller 10.

Another feature of the invention is that the coal which bypasses the upper belt run 14 is guided on to the upper surface of the lower belt run 12 so that this bypassed coal is carried to the tail roller. Some of this coal may be in the form of pieces too large to be slurred and handled by the pump 54. The action of the tail roller 10 on these pieces reduces their size so that they can be slurried and pumped. In the illustrated embodiment the guiding function is provided by two longitudinally extending baffle plates 76 located between the belt runs 12 and 14. The baffle plates 76 extend essentially the entire length of the enclosure 16 and are inclined downwardly and laterally inwardly, so that coal falling from the edges of the upper belt run 14 will strike the upper surfaces of the baffle plates 76 and be deflected inwardly.

The operation of the apparatus is summarized as follows. Coal is discharged from the feeder-crusher downwardly through the opening 28 in the top of the enclosure 16 on to the upper run 14 of the endless belt and is thereby conveyed out of the enclosure 16. Inherently some coal will spill over the edges of the upper belt run 14 within the enclosure 16 and will either fall to the bottom of the enclosure 16 or be deflected by the baffle plates 76 onto the upper surface of the lower belt run 12. The deflected coal will be reduced in size by the action of the tail roller 10 and lower belt run. The jets 34 and 36, which receive water from the main water conduit 38 via the belt-operated valve 40, spray water throughout the interior of the enclosure and convert the coal particles, including airborne coal dust to a slurry. The slurry flows to and along the bottom wall 24 of the enclosure and enters the transverse auger conveyor 48 through the opening 44 in the bottom wall 24. The conveyor 48, being driven from the tail roller 10 by the chain and sprocket assembly 64,66,68, transfers the slurry to the auger outlet 50. From the outlet 50 the slurry enters the inlet of the slurry pump 54 which is driven from the tail roller 10 by the chain and sprocket assembly 70,72,74. The pump 54 discharges into the line 56 which in turn discharges the slurry onto the upper belt run 14. The overall result of the operation of the device is that spillage and release of respirable dust from the tail piece is reduced.

What is claimed is:

1. In an endless conveyor system for mined particulate material: an endless belt conveyor including a horizontal tail roller, an endless belt looped over the tail roller and having an upper run moving away from the tail roller and a lower run moving toward the tail roller; a water supply conduit for supplying water under pressure an enclosure surrounding the tail roller and the adjacent portions of the upper and lower belt runs, the enclosure having a bottom wall beneath the lower belt run, side walls located laterally of the ends of the tail roller and a top wall above the upper belt run, the top wall having an opening therein through which mined material to be conveyed can be deposited on the upper belt run; water spray means within the enclosure for spraying water into the enclosure so as to form a slurry with particulate material which bypasses the upper run of the belt and with dust particles within the enclosure; valve means connected between said water supply conduit and said water spray means for supplying water to said spray means; means for opening and closing the valve means mechanically connected to the valve means and to a moving part of the conveyor such that the valve means opens in response to running of the conveyor and closes in response to non-running of the conveyor; and slurry conveying means for pumping the slurry to the upper run of the belt, said slurry conveying means including a mechanical slurry conveyor, a mechanical drive connection between the slurry conveyor and a rotating portion of said endless belt conveyor, a slurry pump for receiving slurry from the slurry conveyor and for pumping the slurry to the upper run of said endless belt conveyor and a mechanical drive connection between the slurry pump and a moving portion of said endless belt conveyor.

2. Apparatus as in claim 1 wherein said slurry conveyor is an auger and wherein said drive connection includes a sprocket and endless chain assembly.

3. Apparatus as in claim 1 wherein a part of said drive connection between the slurry pump and the conveyor is in frictional contact with one of the belt runs.

4. Apparatus as in claim 1 wherein a part of said opening and closing means is in frictional contact with one of the belt runs.

5. In a conveyor system located in a coal mine for transporting coal out of the mine, said system having an endless belt conveyor which includes a horizontal tail roller around which is looped an endless belt having an upper run moving away from the tail roller, said conveyor being located adjacent a water supply conduit for supplying water under pressure: apparatus for reducing the release of particulate coal from the tail roller portion of the conveyor into the mine, said apparatus comprising an enclosure surrounding the tail roller and the adjacent portions of the upper and lower runs of the belt, said enclosure having an upwardly facing inlet opening throgh which coal is deposited on the upper belt run and said enclosure being open at one end to allow the lower run to enter the enclosure and the upper run to leave the enclosure; a water spray system including a plurality of spray nozzles having outlets arranged within the enclosure so as to spray water into the enclosure to thereby form a slurry of those coal particles which bypass the upper belt run and of coal dust, a water connection to said water supply conduit and valve means mechanically connected to a moving part of the conveyor so as to be responsive to running of the conveyor to pass water from said water supply conduit through said valve means to said nozzles; a horizontal auger-type conveyor located in the enclosure below the lower belt run and transverse thereto for transferring slurry to one side of the enclosure, said auger-type conveyor being mechanically connected to a moving part of the belt conveyor so as to be driven thereby; and a slurry pump assembly mechanically connected to a moving part of the conveyor so as to be driven thereby, said pump assembly having an inlet for receiving slurry from the auger-type conveyor and a discharge outlet located above the upper belt run for discharging slurry onto the upper belt run so as to be carried away thereby.

* * * * *